(12) United States Patent
Hooker et al.

(10) Patent No.: US 8,707,018 B1
(45) Date of Patent: Apr. 22, 2014

(54) MANAGING INITIALIZATION OF FILE SYSTEMS

(75) Inventors: Richard A. Hooker, Milford, MA (US); Ashok Ramakrishnan, Morrisville, NC (US); Hongmei Wang, Dover, MA (US); Joseph A. Leslie, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 359 days.

(21) Appl. No.: 13/170,827

(22) Filed: Jun. 28, 2011

(51) Int. Cl.
*G06F 9/00* (2006.01)
*G06F 9/24* (2006.01)
*G06F 1/24* (2006.01)

(52) U.S. Cl.
USPC .................................. 713/2; 713/1; 713/100

(58) Field of Classification Search
USPC ............................................................ 713/2
See application file for complete search history.

(56) References Cited

U.S. PATENT DOCUMENTS

| 6,073,232 | A  | * | 6/2000 | Kroeker et al. ............... 713/1 |
| 6,714,949 | B1 | * | 3/2004 | Frey, Jr. ......................... 1/1 |
| 7,181,608 | B2 | * | 2/2007 | Fallon et al. ................... 713/2 |
| RE40,092  | E  | * | 2/2008 | Kang .............................. 713/2 |
| 7,669,044 | B2 | * | 2/2010 | Fitzgerald et al. ............. 713/1 |
| 7,932,933 | B2 | * | 4/2011 | Tsujii et al. ............... 348/231.2 |
| RE42,727  | E  | * | 9/2011 | Kang .............................. 713/2 |
| 8,090,936 | B2 | * | 1/2012 | Fallon et al. ................... 713/2 |
| 8,112,619 | B2 | * | 2/2012 | Fallon et al. ................... 713/2 |
| 8,171,278 | B2 | * | 5/2012 | Joshi et al. .................... 713/2 |

* cited by examiner

*Primary Examiner* — Suresh Suryawanshi
(74) *Attorney, Agent, or Firm* — Krishnendu Gupta; Deepika Bhayana (57) ABSTRACT

A method is used in managing initialization of file systems. Activity of file systems is monitored. The file systems include a first and second set of file systems. Based on activity of the file systems, the first set of file systems is associated with a first section of a boot configuration file and the second set of file systems is associated with a second section of the boot configuration file. The first and second sets of file systems are initialized for providing access to the first and second sets of file systems. Access to the first set of file systems is provided before initializing the second set of file systems.

15 Claims, 10 Drawing Sheets

| time | Meta Vol | fs | Read* KiB/s | Ave Read size* Bytes | Read* Ops/sec | Read* Ops % | Write* Requests/s | Write* KiB/s | Ave Write* Size* Bytes | Write Ops/s % |
|---|---|---|---|---|---|---|---|---|---|---|
| 14:35:45 | 575 | WiniSCSI | 523 | 512 | 678 | 100 | 1017 | 508 | 512 | 28 |
| 14:35:46 | 533 | 87 | 546 | 512 | | | 1373 | 11136 | 8305 | 38 |
| 14:35:47 | 162 | 1 | | 0 | 0 | | 1181 | 10496 | 9101 | 33 |
| 14:35:48 | 575 | WiniSCSI | 761 | 380 | 512 | 100 | 1088 | 544 | 1088 | 29 |
| 14:35:49 | 533 | 87 | | | | | | | | 37 |
| 14:35:50 | SNBS5 | | | | | | 18 | 308 | 17522 | 100 |
| 14:35:51 | 168 | 3 | | | | | 4 | 20 | 5120 | 100 |
| 14:35:52 | 533 | 87 | | | | | 1490 | 12112 | 8324 | 40 |
| 14:35:53 | 162 | 1 | | | | | 1436 | 12392 | 8837 | 37 |
| 14:35:54 | SNB1 | Root_fs | 1 | 4096 | 1 | 0 | 33 | 616 | 19115 | 1 |
| 14:35:55 | 74 | | | | | 2 | 6 | 48 | 8192 | 100 |
| 14:35:45 | SNBS6 | | | | | 3 | 9 | 3072 | 3 | |

MANAGING INITIALIZATION OF FILE SYSTEMS

BACKGROUND

1. Technical Field

This application relates to managing initialization of file systems.

2. Description of Related Art

Computer systems may include different resources used by one or more host processors. Resources and host processors in a computer system may be interconnected by one or more communication connections. These resources may include, for example, data storage devices such as file servers and those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A data storage system, such as a file server, has a number of disk drives for storing files of one or more file systems, and at least one data processor coupled to the disk drives for access to the file systems. The data processor executes various computer programs. Occasionally it becomes necessary to restart execution of the data processor by resetting the data processor. For example, the data processor is reset after its normal sequence of program execution has become disrupted by an error such as a power surge, a program memory failure, and a software bug. Alternatively, a failure of a data processor in a file server may trigger a failover process that transfers functions of the data processor to a standby data processor of the file server in order to provide continuous availability of data to clients connected to the file server. Moreover, the failover process may be triggered due to failures such as a bad disk in a data storage system. Typically, a data processor of a file server executes application programs with the assistance of an operating system program. The reset of the data processor causes a "re-boot" (also referred to as "reboot") of the operating system, followed by the mounting of file systems, and initiation of execution of one or more application programs. If the file server contains a large number of small files, it may take a long time (e.g. hundreds of seconds) before access to data may be restored for clients connected to the file server. During the reboot of the operating system, clients of the file server are denied access to files in the file server.

SUMMARY OF THE INVENTION

A method is used in managing initialization of file systems. Activity of file systems is monitored. The file systems include a first and second set of file systems. Based on activity of the file systems, the first set of file systems is associated with a first section of a boot configuration file and the second set of file systems is associated with a second section of the boot configuration file. The first and second sets of file systems are initialized for providing access to the first and second sets of file systems. Access to the first set of file systems is provided before initializing the second set of file systems.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing initialization of file systems, which technique may be used to provide, among other things, associating file systems with a section of a boot configuration file of a data storage system based on activity of the file systems, and initializing the file systems in an ordered arrangement where access to some of the file systems is provided before initializing other file systems in the boot configuration file.

In at least one storage system implementation of the current technique as described below, when a data processor of a data storage system such as a file server is initialized during a failover process or a reboot process, a client connected to the file server may access active file systems before inactive file systems are initialized, thus reducing an amount of time the client may lose access to data during the failover or reboot of the data processor because the client may no longer need to wait for initialization of inactive file systems.

Generally, a boot configuration file is created for initializing a data processor of a file server and stored on a persistent storage when the file server is configured. A boot configuration file includes bootable objects that are required to execute one or more services or applications on a file server. One or more services or applications running on a file server provide to clients connected to the file server access to data stored in file systems. A bootable object is an object associated with services such as configuration of network devices, network interfaces, storage devices, creation of a file system, creation of a snapshot of the file system, creation of a logical volume and a meta volume required to create the file system, configuration of the logical volume and the meta volume, and execution of application services (e.g., NFS 41, CIFS 42). A bootable object is updated when an attribute associated with the bootable object is added, deleted or modified by one or more services executing on a file server. A boot configuration file is recreated from bootable objects either when a data processor of a file server reboots due to a failure, a manual reset of the data processor, or when the data processor failovers to a standby data processor. Further, bootable objects are stored on a persistent storage on a file server.

In a conventional system, bootable objects are included in a boot configuration file in a predetermined order when the boot configuration file is created. In such a conventional system, the boot configuration file initializes each bootable object included in the boot configuration file when a data processor reboots or failovers to a standby data processor of a file server. Further, in such a conventional system, clients connected to the file server lose access to data of file systems when the data processor reboots or failovers to the standby data processor. In such a conventional system, the clients may need to wait to access data of file systems until every bootable object included in the boot configuration file is initialized. In such a conventional system, an amount of time required to initialize every bootable object included in the boot configuration file may span, for example, from few seconds to hundreds of seconds based on a number of file systems created on the file server. Thus, in such a conventional system, clients of the file server may not access data of any one of the file systems until every bootable object associated with each file system is initialized.

By contrast, in at least some implementations in accordance with the current technique as described herein, the use of the managing initialization of file systems can provide one or more of the following advantages: reducing an amount of time a file server takes to reboot a data processor by providing access to a subset of file systems of a set of file systems before every file system of the set of file systems is initialized, reducing an amount of down time during a failover of a data processor of a file server by providing access to active file systems as soon as the active file systems are initialized and reducing a wait time for clients connected to the active file systems by initializing the active file systems before initializing inactive file systems.

In at least one embodiment, the current technique can be used to reduce an amount of time a failover process takes in a data storage system that includes a virtual operating system such as VMware operating system. A virtual operating system includes one or more layers of services that are initialized during the failover process. A failover process in a virtual operating system may be triggered by a bad disk or a failure in a data storage system. Conventionally, a host client connected to a data storage system including a virtual operating system may not access the data storage system until each layer of service included in the virtual operating system is initialized. In at least one embodiment, the current technique can be used to enable access to the data storage system by the host client by providing access to a layer of service of the virtual operating system after the layer of service is initialized and before each layer of service is initialized.

Figure 1:
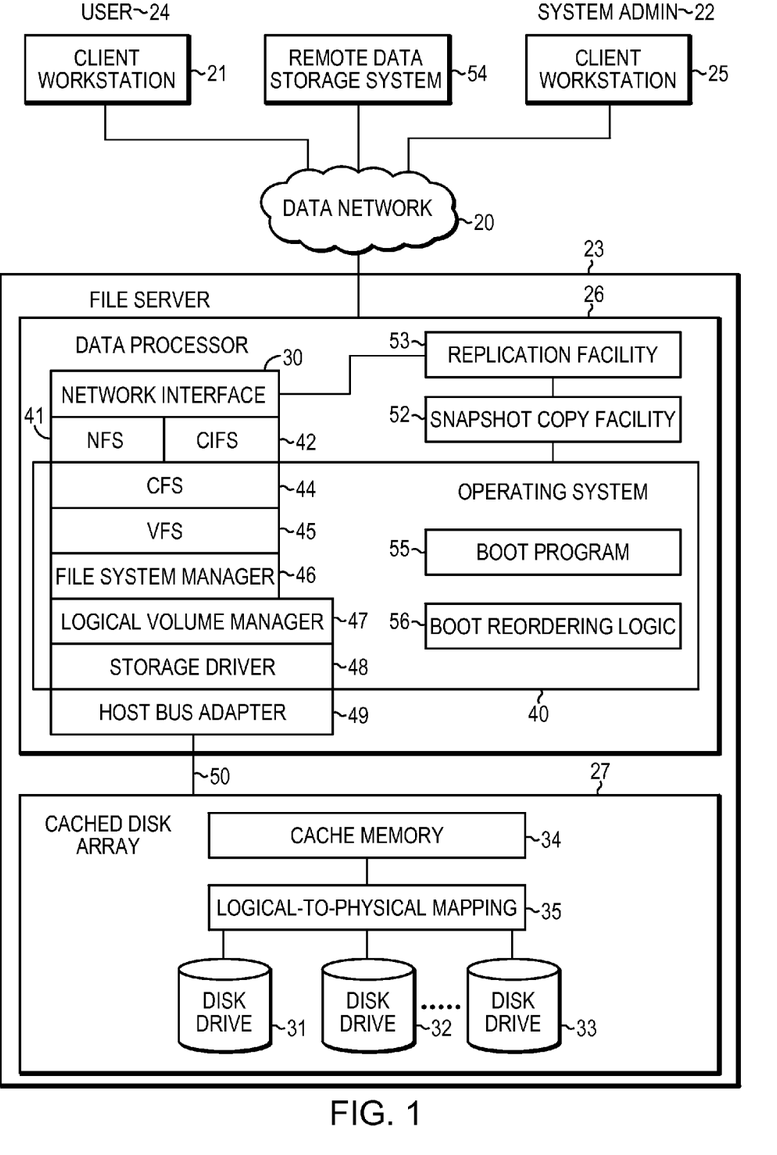
FIGS. 1-2 are an example of an embodiment of a computer system that may utilize the techniques described herein.

Referring now to FIG. 1, shown is an example of an embodiment of a data storage system that may be used in connection with performing the technique or techniques described herein. The data storage system 23 includes a data network 20 interconnecting clients 21, 22 and servers such as a network file server 23 (also referred to simply as "file server") and a remote data storage system 54. The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 27. The data processor 26, for example, is a commodity computer. The cached disk array 27 includes multiple disk drives 31, 32, 33, a high-speed random-access cache memory 34, and logical-to-physical mapping 35 between the cache memory 34 and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume manager module 47. Each logical volume maps to contiguous logical storage addresses in the cached disk array 27. The logical volume manager module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 27.

Referring again to FIG. 1, the CFS module 44, the VFS module 45, the file system manager 46, the logical volume manager 47, and the storage driver 48 are modules of an operating system program 40. The NFS module 41, and CIFS module 42 are internal application programs supported by the operating system 40. The data processor 26 is programmed with additional internal application programs including a snapshot copy facility 52, and a replication facility 53.

The snapshot copy facility 52 performs a copy-on-first-write to each block in a production volume, in order to save an old version ("before image") of the changed block in a snapshot volume. The replication facility 53, for example, replicates, to the remote data storage system 54, changes between a most recent snapshot copy and the next-most-recent snapshot copy of the production volume. Details regarding such a snapshot copy facility 52 and a replication facility 53 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 1, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 23 may include one or more network file servers. Each of the network file server may include one or more data storage devices, such as disks. Each of the network file server included in data storage system 23 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single data storage system may be accessed by multiple clients allowing the multiple clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

In at least one embodiment of the current technique, operating system 40 of data processor 26 includes boot program 55 and boot reordering logic 56. Boot program 55 is invoked when a sequence of program execution by the data processor 26 is reset. For example, the data processor 26 is responsive to a hardware reset input line triggered by a watchdog timer circuit or a reset push-button switch on a front panel of the data processor. When the hardware reset input line is triggered, an instruction counter of the data processor is loaded with a reset vector address pre-programmed in firmware. The reset vector address is the starting address of the boot program. The data processor 26 can also be reset in response to a user-initiated command or in response to a software bug. For example, a software bug may cause an attempt to execute an illegal instruction or to access protected memory, and the processor is reset in response to the illegal instruction or memory access fault. Boot program 55 reads a boot configuration file and initializes bootable objects included in the boot configuration by executing commands associated with the bootable objects. Data processor 26 is ready for clients 21, 22 to execute applications and access data when boot program 55 finishes execution of the boot configuration file. In at least one embodiment of the current technique, boot reordering logic 56 may reorder bootable objects in the boot configuration file in such a way that enables boot program 55 to initialize bootable objects associated with active file systems before initializing bootable objects associated with inactive file systems.

Figure 2:
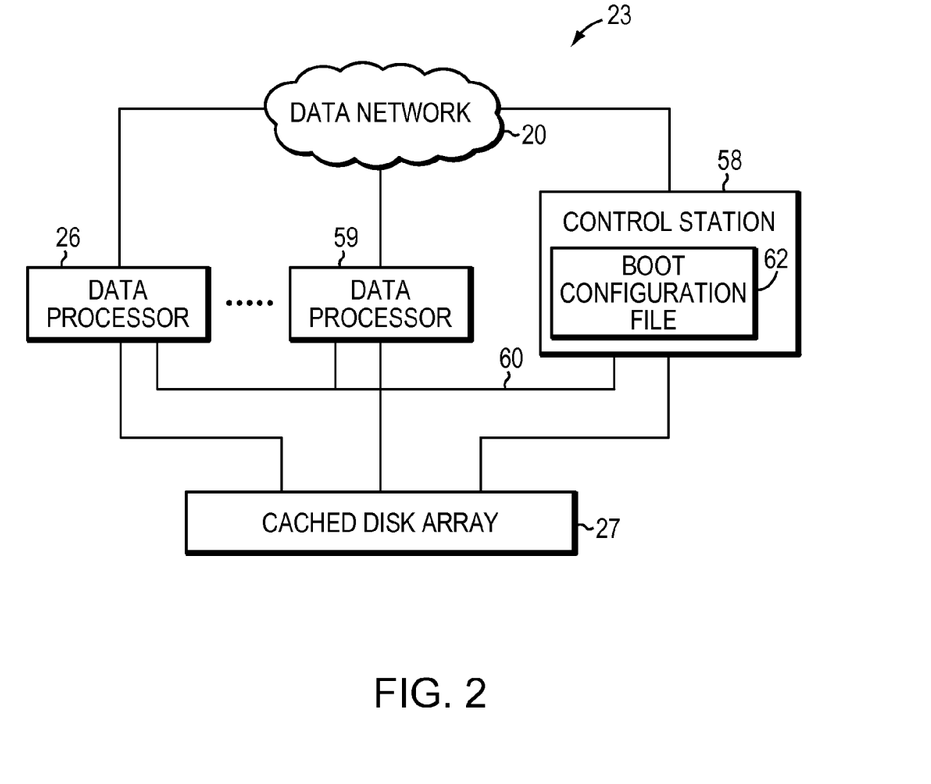

Referring now to FIG. 2, shown is the network file server 23 of FIG. 1 that may further include control station 58 and additional data processors (such as data processor 59) sharing cached disk array 27. A dual-redundant data link 60 interconnects the data processors 26, 59 to the control station 58. The control station 58 monitors a heartbeat signal from each of the data processors 28, 59 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23. The control station 58 also provides certain server configuration information to the data processors 26, 59. For example, the control station maintains boot configuration file 70 (also referred to as "Boot.Config file") accessed by each data processor 26, 59 when the data processor is reset.

Figure 3:
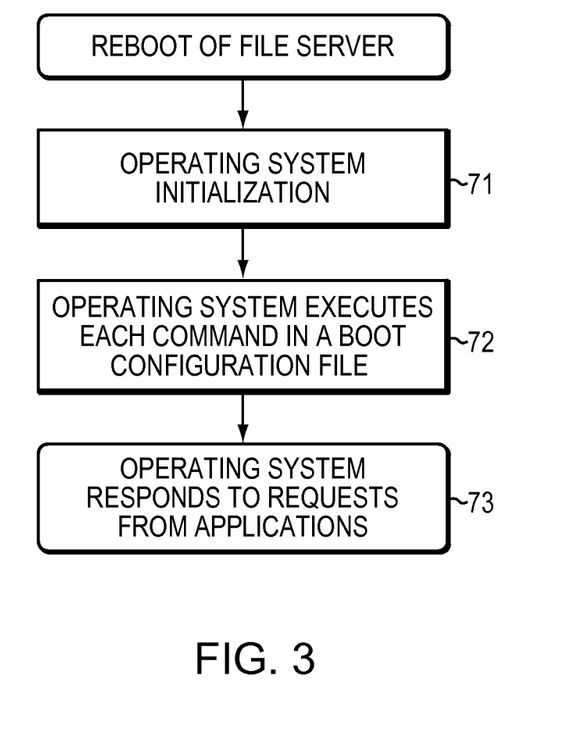
FIG. 3 is a flow diagram illustrating processes that may be used in connection with techniques herein.
Figure 4:
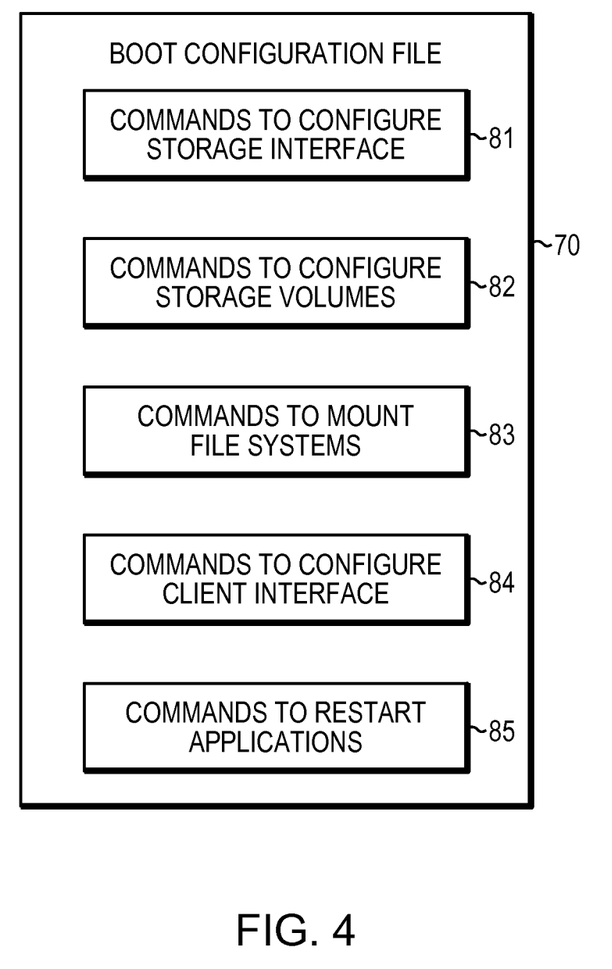
FIG. 4 is a block diagram illustrating in more detail components that may be used in connection with techniques herein.

Referring to FIG. 3, shown is a flow diagram illustrating the method of initializing an operating system of a data processor in a file server. With reference also to FIGS. 1 and 2, boot program 55 includes initialization of the operating system 40 of file server 23 (step 71). Boot program 55 of operating system 40 executes each command included in boot configuration file 70 (e.g. "Boot.Config" file) (step 72). Finally, the operating system 40 responds to requests from internal applications in the file server 23 and clients 21, 22 of the file server 23 (step 73). Referring to FIG. 4, shown is a block diagram of a boot configuration file that is used in at least some embodiments in managing initialization of file systems in a data storage system in accordance with the current technique. With reference also to FIGS. 1 and 2, commands included in the boot configuration file 70 may be categorized in at least five groups. The first group 81 includes commands to configure an interface to a storage device. The second group 82 includes commands to configure logical storage volumes created on the storage device. The third group 83 includes commands to mount file systems created from storage volumes. The fourth group 84 includes commands to configure a client interface for a client connected to file server 23. The fifth group 85 includes commands to restart applications executing on file server 23. Boot program 55 executes the commands included in the boot configuration file 70 in order to configure the interfaces of the data processor 26 to the cached disk array 27, as specified by the commands 81. Then the boot program 55 configures the logical storage volumes of the storage device specified by the commands 82. Then the boot program 55 mounts the file systems specified by the commands 83, and executes export commands for each file system mount command specified in the boot configuration file 70. Then the boot program 55 configures network interfaces of the data processor 26 as specified by the commands 84. Then the boot program 55 initiates execution of application programs as specified by the commands 85.

Figure 5:
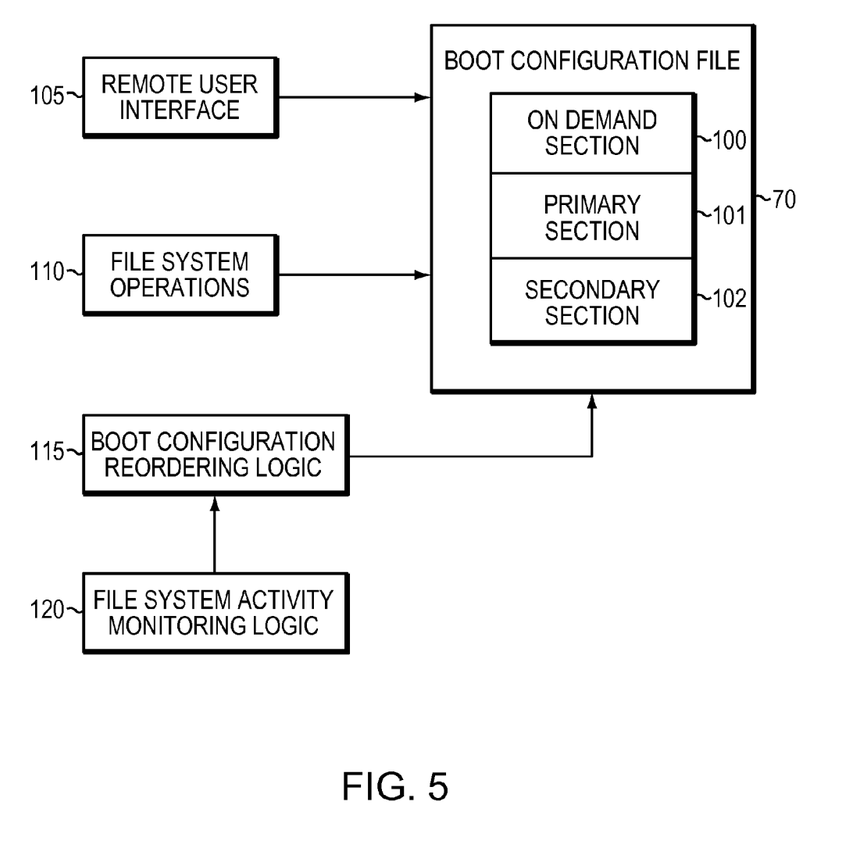
FIGS. 5-6 are diagrams illustrating in more detail components that may be used in connection with techniques herein

Referring to FIG. 5, shown is a more detailed representation of components that may be included in an embodiment using the techniques described herein. In at least one embodiment in accordance with the current technique, boot configuration file 70 includes one or more sections such as on-demand section 100, primary section 101 and secondary section 102. Each bootable object included in the boot configuration file 70 is associated with a section of the boot configuration file 70. In at least one embodiment of the current technique, bootable objects associated with a file system are associated with a section of the boot configuration file 70 based on activity of the file system. One or more sections of the boot configuration file 70 indicates an order in which file systems of file server 23 are initialized during the reboot or failover of data processor 26.

File system activity monitoring logic 120 monitors activity of a file system (e.g. a rate at which I/O operations are performed on a file system). At a predetermined time interval, boot configuration reordering logic 115 assesses the information received from file system activity monitoring logic 120 to determine whether a file system is an active or inactive file system. An active file system is a file system that is accessed by clients more often compared to an inactive file system. In other words, the rate at which I/O operations are performed on an active file system is greater than the rate at which I/O operations are performed on an inactive file system. However, it should be noted that, any predetermined criteria and/or a set of factors may be used to make a determination whether an activity on a file system indicates that the file system is an active file system. An active file system is associated with primary section 101 of boot configuration file 70 and an inactive file system is associated with secondary section 102 of the boot configuration file 70. Additionally, commands associated with bootable objects for logical volumes of an active file system, a mountpoint of the active file system, a mount of the active file system, a snapshot copy of the active file system, a replica of the active file system, an application object (e.g., CIFS, NFS) associated with the active file system is also included in primary section 101 of the boot configuration file 70. Similarly, commands associated with bootable objects for logical volumes of an inactive file system, a mountpoint of the inactive file system, a mount of the inactive file system, a snapshot copy of the inactive file system, a replica of the inactive file system, an application object (e.g., CIFS, NFS) associated with the inactive file system is also included in secondary section 102 of the boot configuration file 70. Further, in at least one embodiment of the current technique, boot configuration reordering logic 115 changes association of an inactive file system with secondary section 102 to primary section 101 when activity of the inactive file system indicates that the inactive file system has become an active file system based on information from file system activity monitoring logic 120. Similarly, boot configuration reordering logic 115 changes association of an active file system with primary section 101 to secondary section 102 when activity of the active file system indicates that the active file system has become an inactive file system based on information from file system activity monitoring logic 120.

In at least one embodiment of the current technique, a user of file server 23 using remote user interface 105 may indicate a file system as a high priority or high availability file system. A file system indicated as a high priority file system is associated with on-demand section 100 of the boot configuration file 70. Additionally, commands associated with bootable objects for logical volumes of a high priority file system, a mountpoint of the high priority file system, a mount of the high priority file system, a snapshot copy of the high priority file system, a replica of the high priority file system, an application object (e.g., CIFS, NFS) associated with the high priority file system is also included in on-demand section 100 of the boot configuration file 70.

Additionally, file system operations 110 such as creation of a file system causes creation of bootable objects associated with the file system. Bootable objects created as a result of a file system operation are associated with secondary section 102 of boot configuration file 70 and may later be changed to primary section 101 based on activity of the file system.

In at least one embodiment of the current technique, boot program 55 executes commands associated with bootable objects included in on-demand section 100. Next, boot program 55 executes commands associated with bootable objects included in primary section 101. Finally, boot program 55 executes commands associated with bootable objects included in secondary section 102 of boot configuration file 70. As a result, during the reboot or failover of data processor 26, file systems associated with on-demand section 100 are initialized before file systems associated with primary section 101 are initialized, and file systems associated with secondary section 102 are initialized after the file systems associated with primary section 101 are initialized. Further, in at least one embodiment of the current technique, clients of file server 23 may access file systems associated with a section of boot configuration file 70 as soon as the file systems associated with the section are initialized. As a result, clients of file server 23 may access data associated with active file systems and high priority file systems before inactive file systems are initialized and thus may not need to wait for every file system included in boot configuration file 70 to be initialized. Therefore, an amount of time a client has to wait during the failover or reboot of data processor 26 is reduced when the client may access active file systems before boot configuration file 70 finishes initializing every file system included in boot configuration file 70 of file server 23. In at least one embodiment of the current technique, boot configuration reordering logic 115 periodically reorders bootable objects of boot configuration file 70 at a predetermined time interval based on activity of file systems. However, a user may configure file server 23 to disable reordering of boot configuration file 70.

Figure 6:
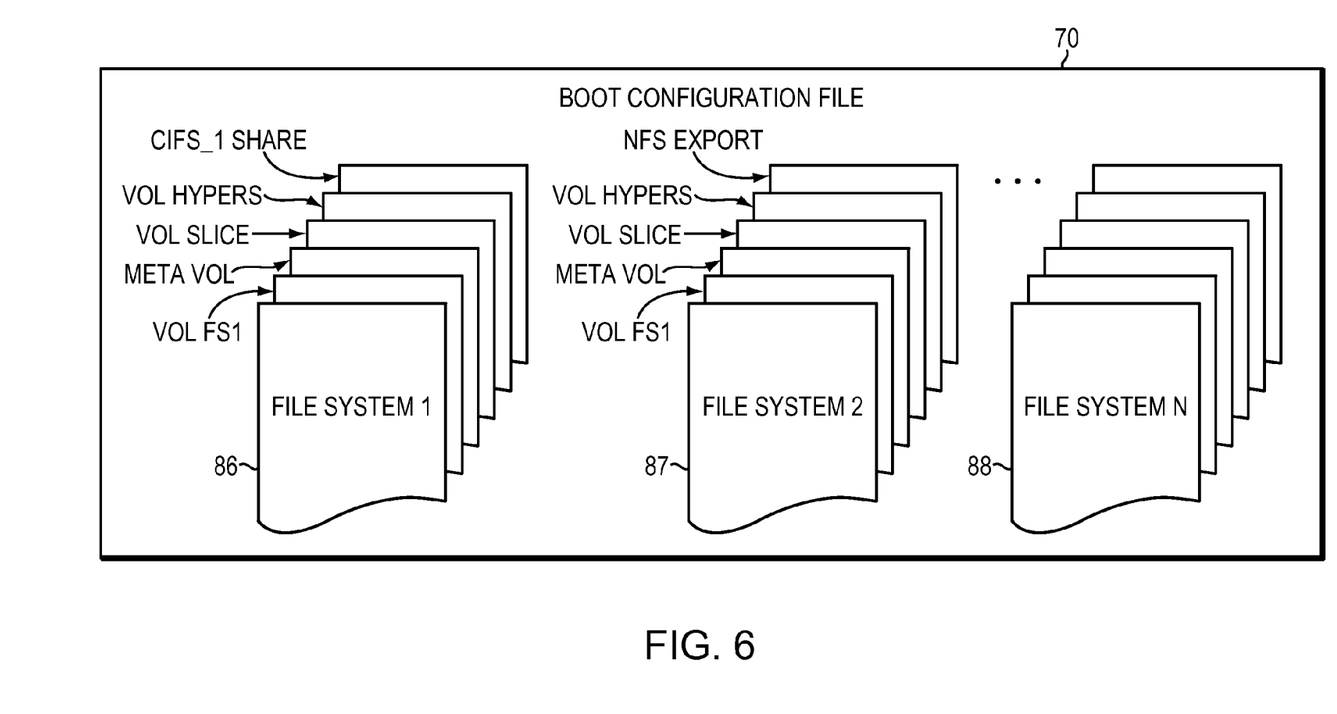

Referring to FIG. 6, shown is a diagram illustrating an example of a boot configuration file in a file server. With reference also to FIGS. 1, 2 and 5, boot configuration file 70 includes bootable objects associated with file systems (e.g., file systems-1 86, file system-2 87, file system-10 88, file systems 3-9 are not shown in FIG. 6). As shown in FIG. 6, for example, if file system-1 86 is indicated by a user as a high priority or high availability file system, bootable objects associated with file system-1 86 are added to on-demand section 100 of the boot configuration file 70. Additionally, for example, if file system-2 87 is determined as an active file system by file system activity monitoring logic 120 based on activity of file system-2 87, bootable objects associated with file system-2 87 are added to primary section 101 of the boot configuration file 70. Moreover, for example, if file system-3 to file system-10 are determined as inactive file systems by file system activity monitoring logic 120 based on activity of file system-3 to file system-10, bootable objects associated with file system-3 to file system-10 are added to secondary section 102 of the boot configuration file 70. When data processor 26 is initialized due to a reboot or a failover, file systems associated with on-demand section 100 (such as file system-1 86) are initialized. Then, file systems (such as file system-2 87) associated with primary section 101 are initialized. Then, file systems (e.g., file system-3 to file system-10) associated with secondary section 102 are initialized. In at least one embodiment of the current technique, clients of file server 23 may access file systems associated with a section of boot configuration file as soon as the file systems are initialized. As a result, as shown in the example of FIG. 6, an amount of time the clients may need to wait before accessing file systems associated with on-demand section 100 is reduced by 90 percent and an amount of time the clients may need to wait before accessing file systems associated with primary section 101 is reduced by 70 percent.

Figure 7:
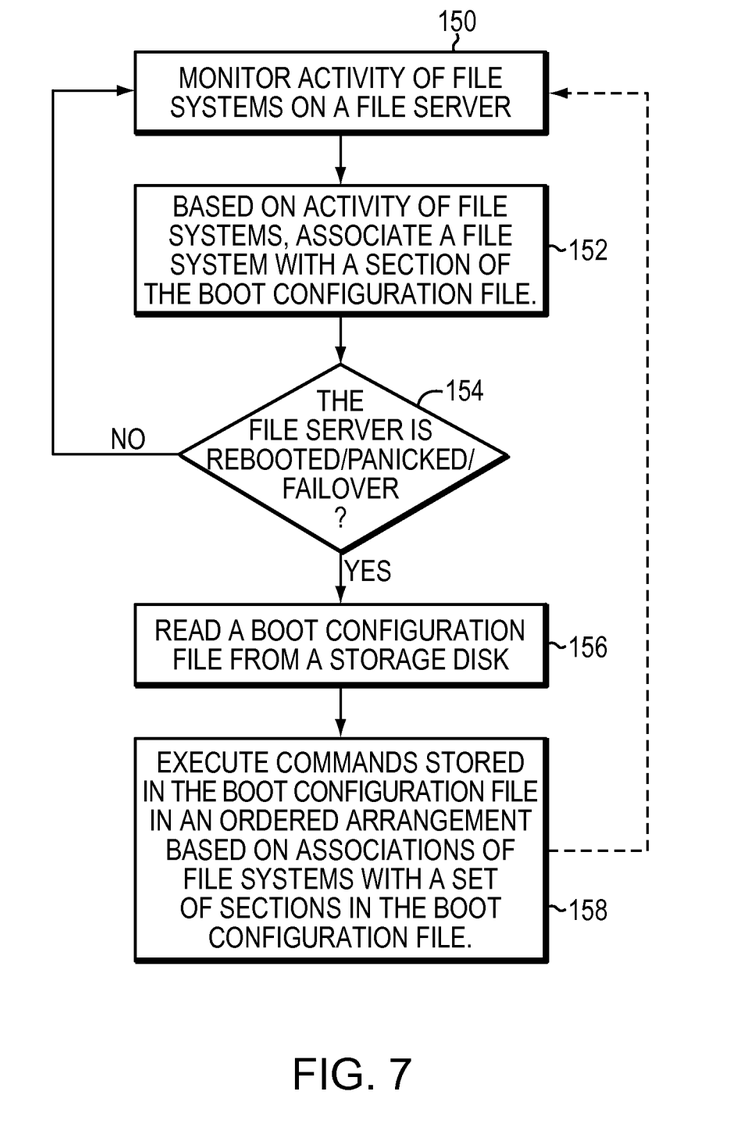
FIGS. 7-8 are flow diagrams illustrating processes that may be used in connection with techniques herein.

Referring to FIG. 7, shown is a flow diagram illustrating an example of the method of managing initialization of file systems in data storage systems. With reference also to FIGS. 1, 2 and 5, file server 23 monitors activity of a set of file systems (step 150). A file system of the set of file systems is associated with a section (such as on-demand section 100, primary section 101 and secondary section 102) of the boot configuration file 70 (step 152). If data processor 26 of file server 23 reboots due to a failure or a failover (step 154), boot configuration file is created from information such as bootable objects stored on a storage disk of file server 23 (step 156). Boot configuration file 70 is created in an ordered arrangement based on association of file systems to sections of the boot configuration file 70 (step 158). Commands to initialize bootable objects associated with file systems included in the boot configuration file 70 are executed based on the ordered arrangement (step 160). First, file systems associated with on-demand section 100 of the boot configuration file 70 are initialized. As soon as the file systems associated with on-demand section 100 are initialized, access to the file systems is enabled and clients 21, 22 may access data of the file systems. Next, file systems associated with primary section 101 of the boot configuration file 70 are initialized. As soon as the file systems associated with primary section 101 are initialized, access to the file systems is enabled and clients 21, 22 may access data of the file systems. Next, file systems associated with secondary section 102 of the boot configuration file 70 are initialized. As soon as the file systems associated with secondary section 102 are initialized, access to the file systems is enabled and clients 21, 22 may access data of the file systems. If data processor 26 of file server 23 does not reboot due to a failure or a failover, file server 23 continues monitoring activity of file systems (step 154).

Figure 8:
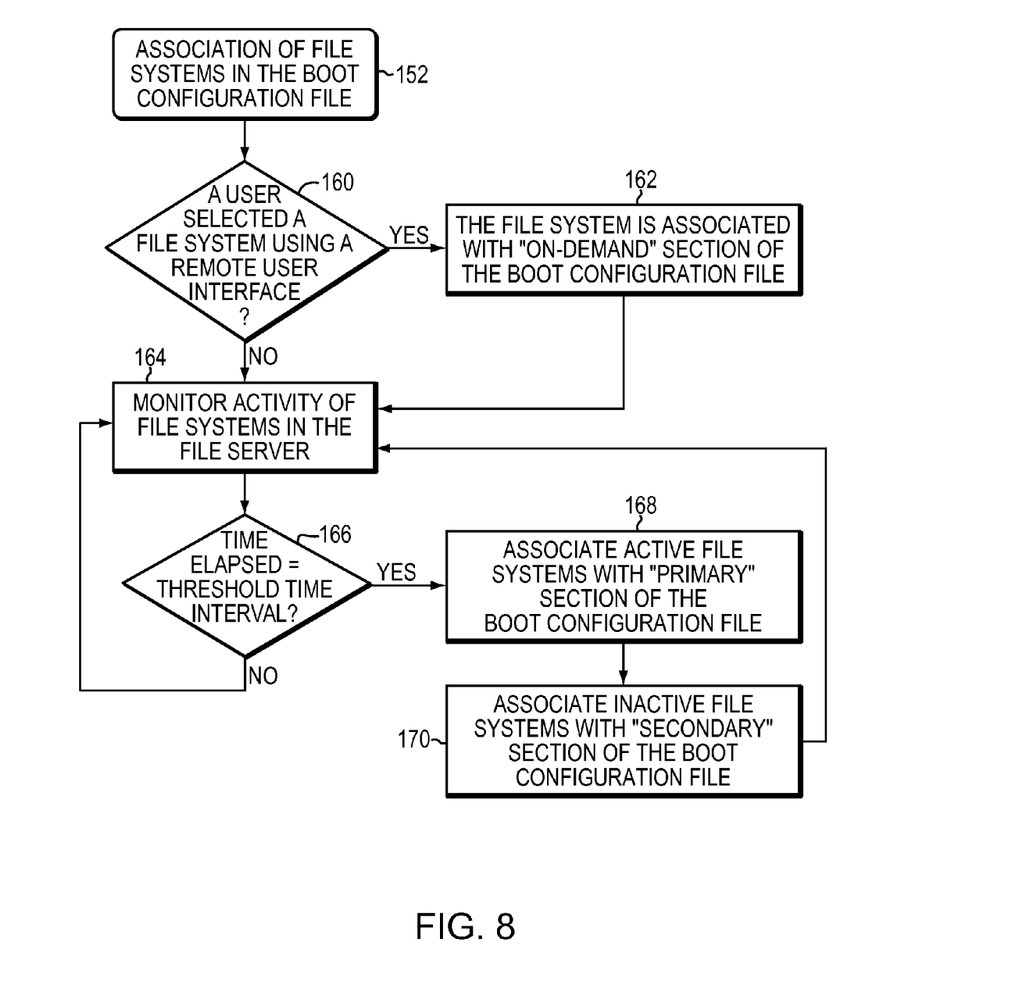

Referring to FIG. 8, shown is a more detailed flow diagram illustrating an example of the method of reordering of a boot configuration file for managing initialization of file systems in data storage systems. With reference also to FIGS. 1, 2 and 5, if a user indicates a file system as a high availability or high priority file system using a remote user interface 105 (step 160), the file system is associated to on-demand section 100 of the boot configuration file (step 162). File server 23 monitors activity of file systems (step 164). At a predetermined time interval, file server 23 makes a determination whether an amount of time elapsed since activity of file systems was last monitored is equal to a threshold time interval (step 166). If the amount of time elapsed is less than the threshold time interval, file server 23 continues monitoring activity of file systems. If the amount of time elapsed is equal to the threshold time interval, information related to activity of file systems is assessed and a determination is made regarding whether file systems are active file systems or inactive file systems. Active file systems are associated with primary section 101 of the boot configuration file 70 (step 168). Inactive file systems are associated with secondary section 102 of the boot configuration file 70 (step 170). Further, in at least one embodiment of the current technique, a background process executing on control station 58 of network file server 23 may be used to reorder bootable objects in an ordered arrangement for creating bootable configuration file 70 for a data processor. The background process may use a predetermined criteria to determine whether a file system is an active file system. Based on the determination, the background process updates primary 101 and secondary 102 sections of the boot configuration file 70.

Figure 9:
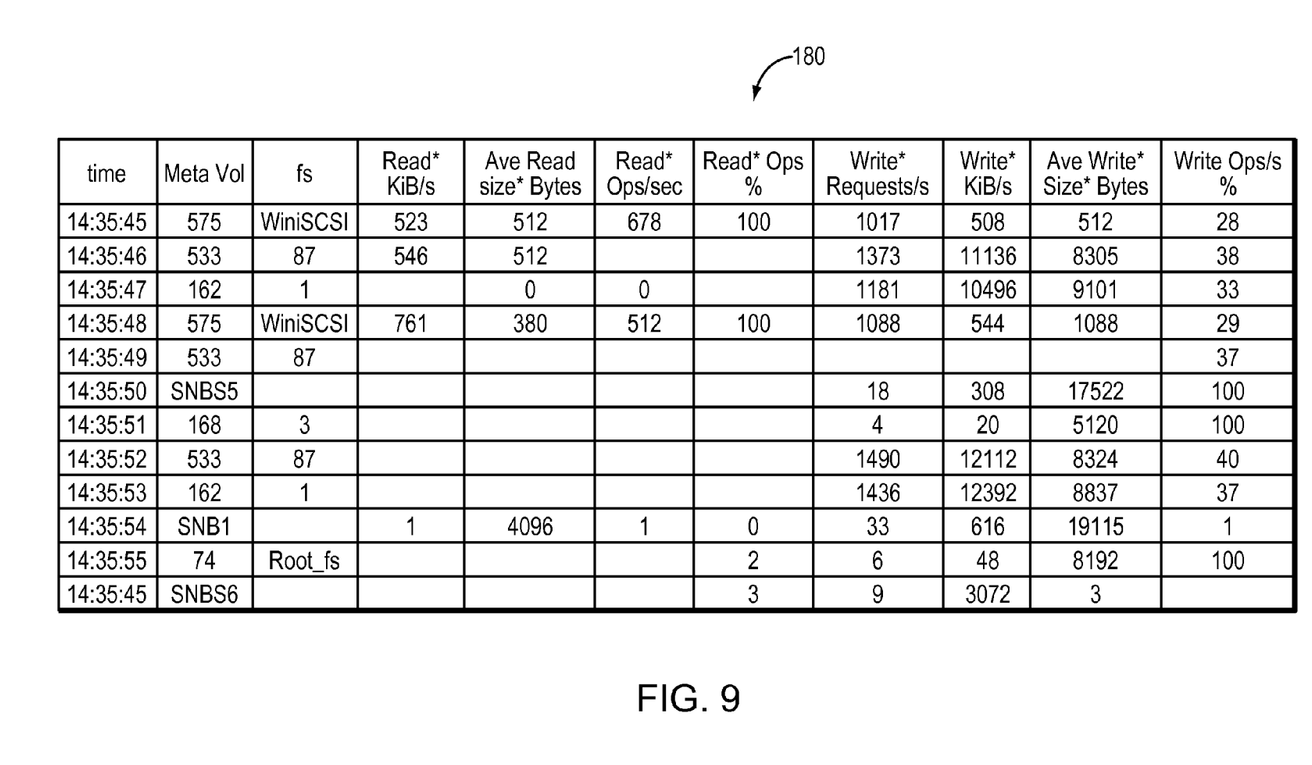
FIGS. 9-10 are representations of a graphical user interface and are an example of an embodiment of a computer system that may utilize the techniques described herein.

FIG. 9 illustrates one of the many ways a user may monitor activity of file systems in a file server. With reference also to FIGS. 1, 2 and 5, shown in FIG. 9 is an example of a snapshot 180 of a user interface of an application that monitors activity of file systems.

Figure 10:
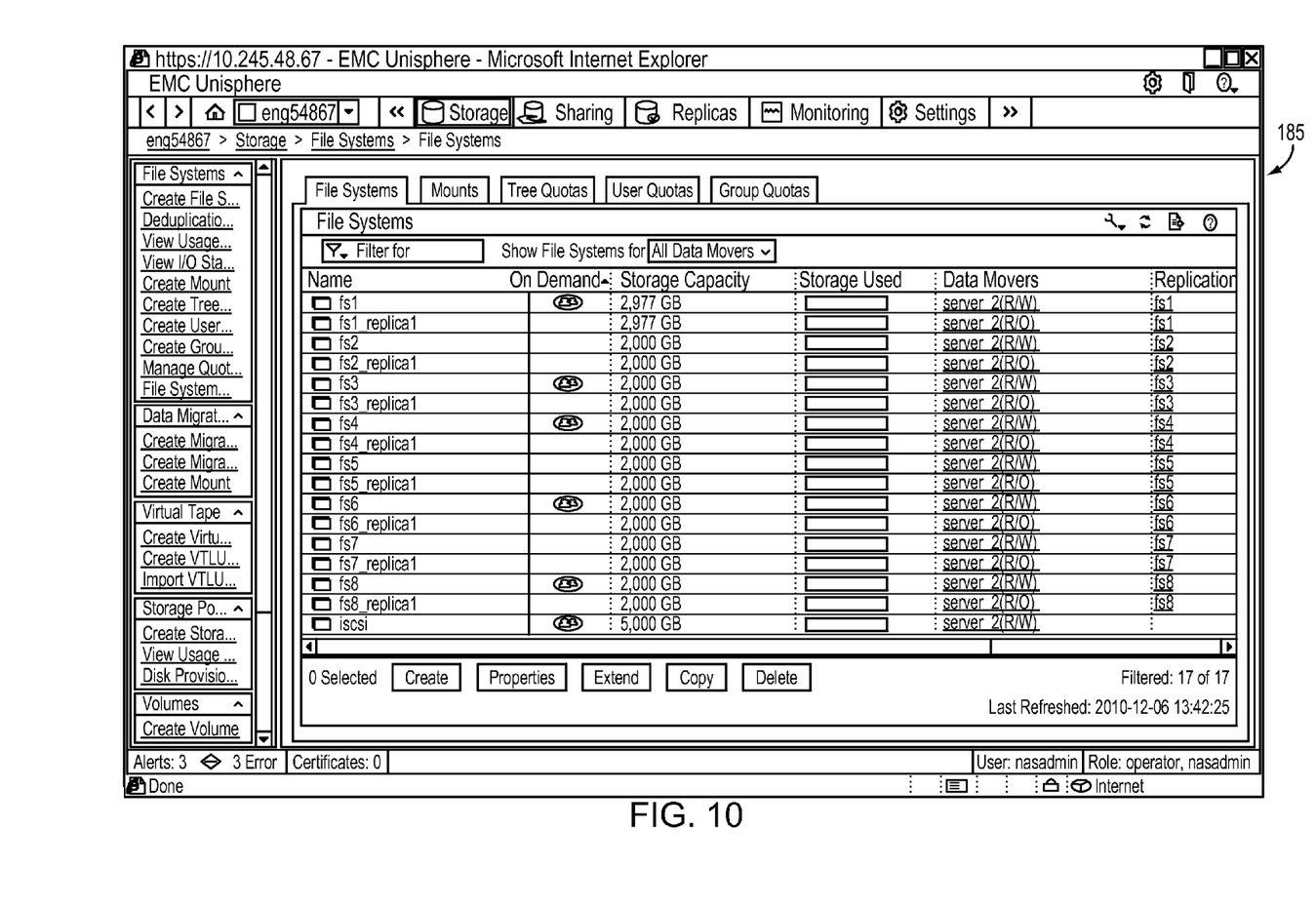

FIG. 10 illustrates one of the many ways a user may indicate a file system as a high priority or high availability file system in data storage systems. Shown in FIG. 10 is an example of snapshot 185 of a user interface of a management application executing on clients 21, 22 of network file server 23. In at least one embodiment of the current technique, a user interface may include a command line interface and/or a graphical user interface. Further, the user may automate the process of indicating a file system as a high priority file system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing initialization of file systems, the method comprising:
    monitoring activity of file systems, wherein the file systems include a first and second sets of file systems;
    based on activity of the file systems, associating the first set of file systems with a first section of a boot configuration file and the second set of file systems with a second section of the boot configuration file, wherein the boot configuration file includes a set of sections, wherein the set of sections include the first and second sections; and
    initializing the first and second sets of file systems for providing access to the first and second sets of file systems, wherein access to the first set of file systems is provided before initializing the second set of file systems.

2. A method for use in managing initialization of file systems, the method comprising:
    indicating a first file system of a set of file systems as a high availability file system, wherein the set of file systems include the first file system and a second file system;
    associating the first file system with a first section of a boot configuration file and the second file system with a second section of the boot configuration file, wherein the boot configuration file includes a set of sections, wherein the set of sections include the first and second sections; and
    initializing the first and second file systems for providing access to the first and second file systems, wherein access to the first file system is provided before initializing the second file system.

3. The method of claim 1, wherein the file systems are initialized upon execution of the boot configuration file.

4. The method of claim 1, wherein the boot configuration file includes an on-demand section, a primary section, and a secondary section.

5. The method of claim 4, wherein file systems associated with the on-demand section are initialized before initializing file systems associated with the primary section, wherein file systems associated with the primary section are initialized before initializing file systems associated with the secondary section.

6. The method of claim 1, further comprising:
    determining, based on whether an amount of time elapsed for monitoring activity of the file systems is less than a threshold time interval, whether to reorder the boot configuration file; and
    based on the determination, reordering the boot configuration file by changing the association of a file system with a section of the boot configuration file based on the activity of the file system.

7. The method of claim 6, wherein changing the association of a file system further comprising:
    moving the file system from the first section of the boot configuration file to the second section of the boot configuration file.

8. The method of claim 2, wherein a file system indicated as a high availability file system by a user is associated with an on-demand section of the boot configuration file.

9. The method of claim 8, further comprising:
    updating a high availability status of a file system; and
    based on the high availability status, removing the file system from the on-demand section of the boot configuration file.

10. A system for use in managing initialization of file systems, the system comprising:
    first logic monitoring activity of file systems, wherein the file systems include a first and second sets of file systems;
    second logic associating, based on activity of the file systems, the first set of file systems with a first section of a boot configuration file and the second set of file systems with a second section of the boot configuration file, wherein the boot configuration file includes a set of sections, wherein the set of sections include the first and second sections; and
    third logic initializing the first and second sets of file systems for providing access to the first and second sets of file systems, wherein access to the first set of file systems is provided before initializing the second set of file systems.

11. The system of claim 10, wherein the file systems are initialized upon execution of the boot configuration file.

12. The system of claim 10, wherein the boot configuration file includes an on-demand section, a primary section, and a secondary section.

13. The system of claim 12, wherein file systems associated with the on-demand section are initialized before initializing file systems associated with the primary section, wherein file systems associated with the primary section are initialized before initializing file systems associated with the secondary section.

14. The system of claim 10, further comprising:
fourth logic determining, based on whether an amount of time elapsed for monitoring activity of the file systems is less than a threshold time interval, whether to reorder the boot configuration file; and
fifth logic reordering, based on the determination, the boot configuration file by changing the association of a file system with a section of the boot configuration file based on the activity of the file system.

15. The system of clam 14, wherein changing the association of a file system further comprising:
sixth logic moving the file system from the first section of the boot configuration file to the second section of the boot configuration file.

\* \* \* \* \*